UNITED STATES PATENT OFFICE.

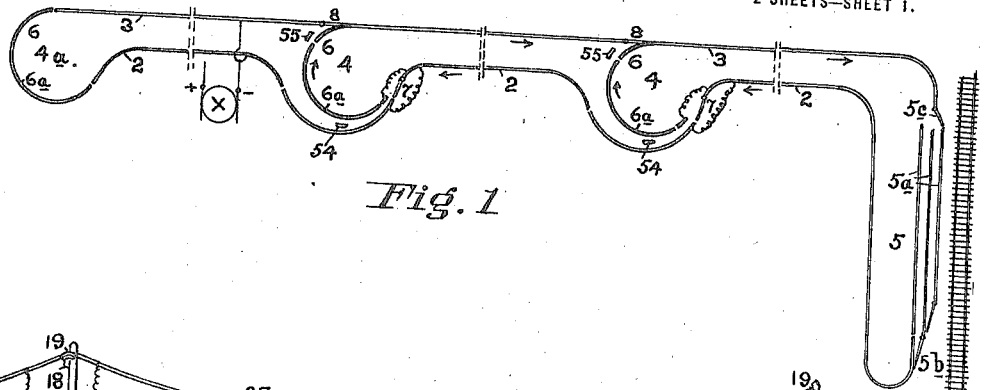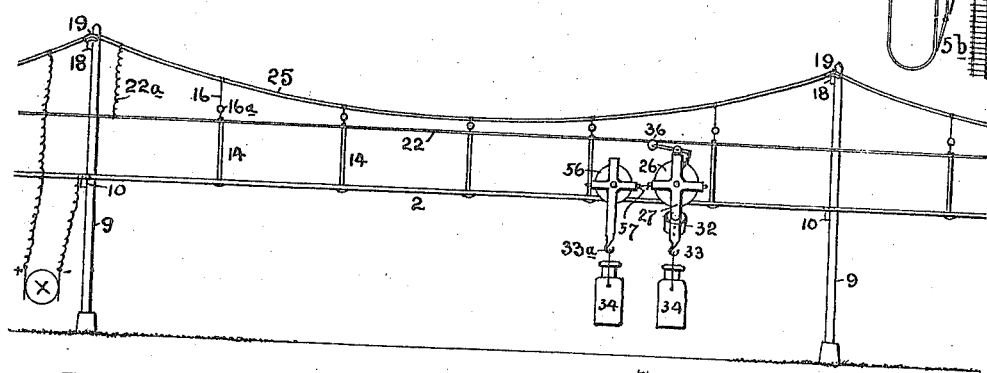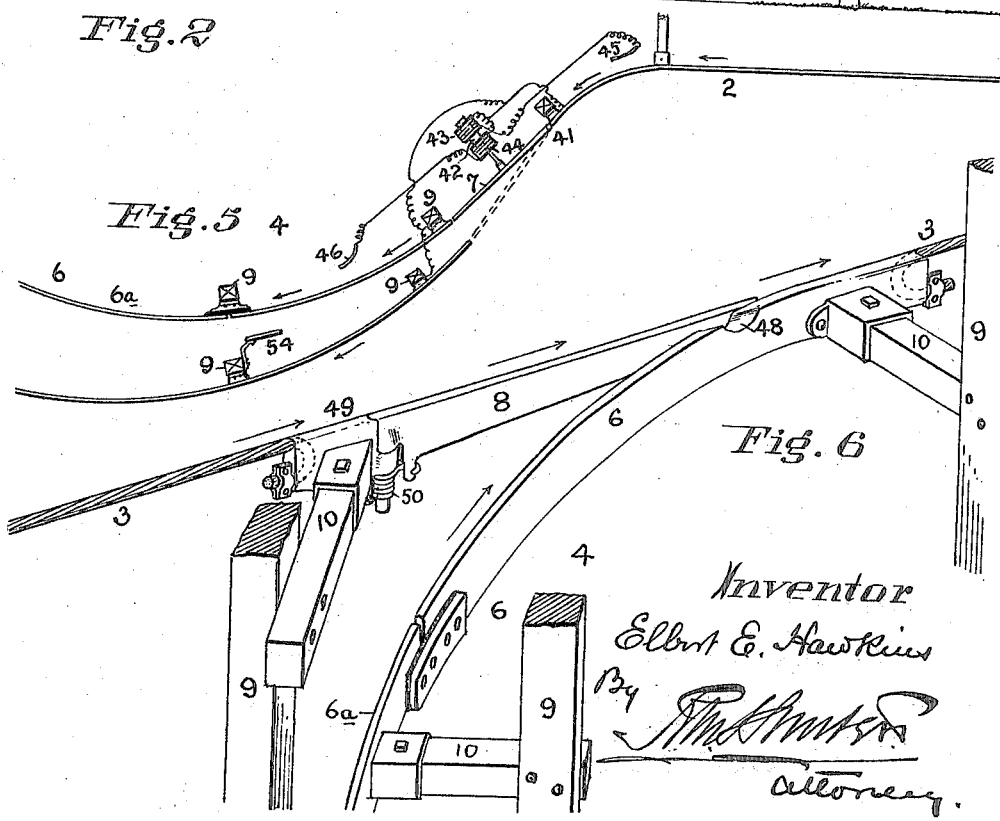

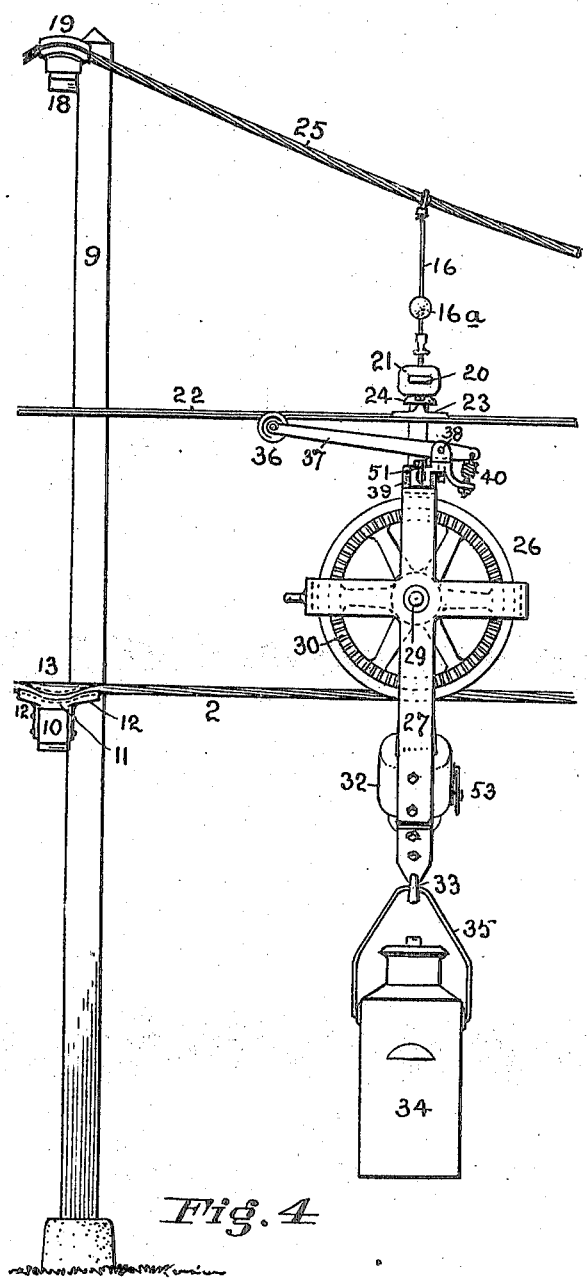
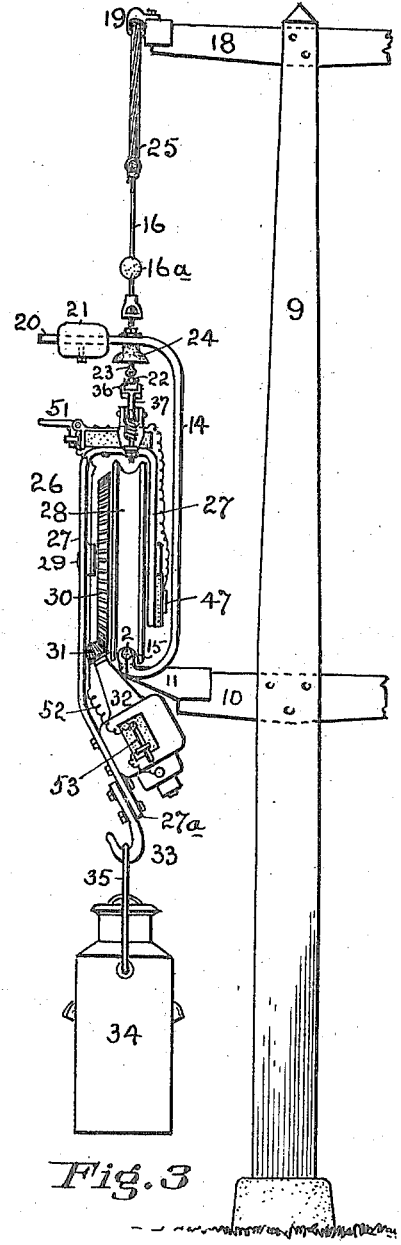
Fig. 4
Fig. 3

ELBERT E. HAWKINS, OF BINGHAMTON, NEW YORK.

ELECTRIC TRANSPORTATION SYSTEM.

1,417,062.   Specification of Letters Patent.   Patented May 23, 1922.

Application filed October 14, 1920. Serial No. 416,878.

*To all whom it may concern:*

Be it known that I, ELBERT E. HAWKINS, a citizen of the United States, and resident of Binghamton, county of Broome, State of New York, have invented an Improvement in Electric Transportation Systems, of which the following is a specification.

The object of my invention is to provide a system of electric transportation, more especially designed for handling milk cans and automatically transporting them in full condition from the farm to the railway station and returning and distributing the empty cans to the respective farms, whereby quick and economical transportation is insured, the milk disturbed to a minimum degree during transportation, and the operation of the electric system is automatic and thereby obviating the necessity of manual control between shipping and receiving stations.

My object is secured by providing a suspended track or cable upon which electrically propelled vehicles are hung and travel and upon which, during travel, they are self controlled, said vehicles having detachably suspended therefrom the cans for transporting milk or other farm products; the suspended track being provided with a plurality of looped local suspended tracks respectively arranged at the different farms reached by the system, said looped local tracks having automatic switches for directing the special electrically propelled vehicles belonging to the respective farms to the looped tracks forming part of their respective equipments, and at the same time automatically shutting off the electric current to cause the vehicles (with empty cans) to come to rest upon said looped tracks and without interfering with the main track or the travel of vehicles thereon from or to other farms, which may be in process of transporting filled or empty cans, as the case may be.

My object is essentially to provide a motive power for conveyance of individual cans, but where desirable and where excessive grades are not present, a single electrically propelled vehicle may in addition to its own load, be made to pull one or more trailers consisting of trolley suspended cans, flexibly connected to the motor vehicle.

My invention also consists of improvements hereinafter described whereby the above objects and results are attained, said improvements comprising certain organization and combination of parts which are fully described hereinafter and more particularly defined in the claims.

Referring to the drawings: Fig. 1 is a diagram representing a plan view of a line and illustrating the branching and looped tracks; Fig. 2 is a side elevation of a portion of the track with an electrically propelled vehicle thereon, embodying my invention; Fig. 3 is a cross section of the track equipment and end view of the electrically propelled vehicle of my invention; Fig. 4 is a side view of the trolley of Fig. 3 and its mode of suspension on the track cable; Fig. 5 is a plan view illustrating the automatic switches at the farms for their looped or local tracks; and Fig. 6 is a perspective view of the switches at said station for the outgoing track.

9 are upright posts having cross arms 10 near their upper portions, upon the outer sides of which are suspended return and outgoing track cables 2 and 3, said cables held in suitable clamping supports 11 secured on the arms and by which the cables are held from creeping lengthwise. A simple construction for these supports 11 consists of a casting having flanges at the bottom to fit over the arms 10 and to which they are bolted, and at the upper portion having alined parts 12, 13, 12, providing a sinuous groove between them in which the cable is placed, said cable lying on top of the grooves to the end portions 12 and under the middle portion 13. The bend in the cable thus provided will prevent slipping or creeping.

While track cable 2 may be the entire means of support for the motor vehicle, I prefer to suspend this track cable by a system of catenary cables and tension connections and these may be constructed as shown. As illustrated, 25 is the catenary cable and is supported in clamps 19 at the outer ends of transverse arms 18 at the extreme upper ends of the posts 9. At intervals along the catenary cable 25 are attached insulating suspending mechanical connections to the trolley wire or conductor 22, and to the track cable 2. The trolley wire 22 is adapted to conduct electricity and the catenary may constitute the feed cable of low resistance and supply from the power station $x$ the small trolley wire 22 with electric current at intervals along its length by suitable conducting connections $22^a$. It will suffice that electrical connections of this character with the trolley be made at quarter-mile intervals. The track cables 2 and 3 act as return conductors to the power station x.

Referring more specifically to these connections, the track cable 2 is clamped at 15 in a J shaped frame 14, which has a horizontal laterally extending arm 20 at the top upon which is adjustably secured a counter weight 21. This frame 14 is directly suspended from the catenary cable 25 by tension members 16 which may consist of upper and lower parts connected by an insulating joint 16ª, the upper part clamped to the catenary cable and the lower part swiveled to the frame 14. The trolley wire 22 is held by a clamp 23 secured by an insulator 24 with the frame 14 at the top so as to be suspended immediately above the track cable 2. All of the connections from the track cable and trolley wire to the catenary cable are the same, but naturally they are of different lengths from the frames 14 to the catenary cable, as will be understood by reference to Fig. 2. The counter weights 21 may be dispensed with if desired, as the weight of the vehicle will bring the track cable 2 into proper vertical alinement when necessary; and at other times the connections of this cable with the clamps 11 of the posts will hold it against lateral displacement or undue swinging. By these constructions, both the track cable and trolley wire may be suspended horizontally.

The looped local tracks 6 at the respective farms 4 are in connection with the outgoing and return main line tracks by means of switches 8 and 7. The loop track 6 is continuous with the outgoing track 3 (of similar construction to track 2) and the latter has a spring actuated switch 8 hinged at 49 and normally closed under the action of a spring 50, (Fig. 6). When the motor vehicle passes from the track 6 to main track 3, it simply pushes past switch 8; and when a motor vehicle passes along main track, it runs upon switch 8 and continues on the main track; the flange of its wheel passing through notch 48 of loop track 6. The loop track 6 may have a dead section 6ª, if so desired.

When the motor vehicles return on main track 2, they either pass along the main track over switch 7 or they are diverted to the loop track 6 by the shifting of switch 7 under the control of the motor vehicles belonging to the particular loop track under consideration. This switch 7 is hinged at 41 and is operated to swing laterally by a solenoid core 42 when acted upon by solenoid coils 43 and 44, which respectively magnetize the core to move the switch in line with the main track or with the loop track, as required. These solenoids 43 and 44 have one terminal connected with the main track which acts as the return conductor, and have their other terminals connected to spring contacts 45 and 46 which are, at proper time, contacted with by a contact 47 on the motor vehicle and by which electric current is supplied to the solenoids. By contacting with fixed contact 45, solenoid 43 is energized and switch 7 is shifted to looped track 6 immediately before the arrival of the motor vehicle; and when the motor vehicle has passed on to the looped track 6, contact is made with the other spring contact 46 and this causes solenoid 44 to become energized and thereby returns the switch 7 to main line 2 again. The movement of these switches are automatic. The reason switch 7 is only operated by motor vehicles belonging to the loop track, of the particular station or farm 4 under consideration, is that contacts 45 and 46 have a definite elevation, owing to which the contact 47 of the particular motor vehicles alone make contact with said contacts 45 and 46. On all other motor vehicles the contacts 47 is either higher or lower and hence does not actuate the particular switch 7 and they pass over it on the main track leading to the next farm or station. While I have shown suitable switches for the purpose required, any other character of switching means, preferably automatic, may be employed, if so desired. In this way every station 4 receives automatically all of its own motor vehicles when returning from the receiving station 5.

At the railroad or receiving station 5, the motor vehicles from all of the farms are received in succession over main track 3 and are quickly unloaded and sent back on return track 2. Where great capacity is required, station 5 is best provided with one or more dead track sections 5ª upon which the motor vehicles may be received over a switch 5ᶜ. The dead track sections each have spring switches 5ᵇ, similar to switches 8, before referred to, whereby the unloaded motor vehicles (or with empty cans) may be returned to the sender over the return track 2.

I will now describe the motor vehicles 26, which are best shown in Figs. 3 and 4. An inverted J shaped frame 27 is provided with a transverse axle 29 to which is secured the grooved supporting and drive wheel 28 adapted to run upon the track cables 2, 3 and 6. The shaft 29 is also provided with a large bevel gear 30 with which a small bevel pinion 31 meshes, the latter driven by the shaft of an electric motor 32. The motor is secured to the lower end of the frame 27 and the motor is preferably set in an oblique direction so as to throw its weight to a position which will cause the motor vehicle to stand upright upon its single wheel 28. The extreme bottom end of the frame 27 is provided with an insulated hook 33 upon which the bail 35 of the can 34 may be hung, whereby the suspended can is insulated. This hook 33 is also immediately below the grooved wheel 28, so that the weight of the full can, together with that of the motor, will cause the frame 27 and wheel 28 to travel in a true vertical position.

36 is a grooved trolley wheel running against the underside of the trolley wire 22; and is journaled on the end of a pivoted arm 37 hinged at 38 to a casting secured on an insulating block 39 on the top of the vehicle frame 27. The trolley wheel is maintained in a running contact with the trolley wire by a spring 40 acting on the pivoted arm 37. By reason of the parallelism of the track cable 2 and trolley wire, the trolley arm 37 may be quite short. 53 is a hand switch on the side of the motor 32 and controls a circuit 52 leading from the trolley contact to one terminal of the motor. The other terminal is connected with the bearings of shaft 29 or otherwise in circuit with the wheel 28 which utilizes the track cable 2 as the return conductor. The motor circuit 52 is also provided with a switch 51 which is automatically opened and closed by suitable cams 54 and 55 fixed at intervals on the railway, cams 54 opening the switch to stop the vehicle and cams 55 to close the switch when the motor vehicle is pushed forward with its load either for travel on the outgoing main track cable 3 or for return over the return track cable 2. If a dead cable section 6ª is employed at the stations, these switches 51 need not be used. The distant station 4ª will need no switches 7 and 8 but would have a dead cable section 6ª unless automatic switch 51 on the motor vehicle is used.

While each can 34 may be transported by an individual motor vehicle, it will be found convenient, where the grade from the stations 4 to station 5 is level or downward, to transport a number of cans on separate trolleys connected to the motor vehicle, as in such cases a motor vehicle may transport a much heavier load than where up-grade travel is required. In these cases, additional trolleys 56 for the additional cans may be employed as trailers. They are flexibly connected together by links 57 and similarly connected to the rear of the motor vehicle frame 27, as shown in Fig. 2. These trolleys would also be provided with insulated depending hooks 33ª for supporting the cans. If there is a down grade from stations 4 to station 5, there would be an up grade on return track cable 2, but this would not interfere, because the returning cans would be empty and therefore the load would be light.

It will now be apparent that I have devised a novel and useful construction which embodies the features of advantage enumerated as desirable, and while I have in the present instance shown and described the preferred embodiment thereof which has been found in practice to give satisfactory and reliable results, it is to be understood that I do not restrict myself to the details, as the same are susceptible of modification in various particulars without departing from the spirit or scope of the invention.

Having now described my invention, what I claim as new and desire to secure by Letters Patent, is:—

1. In an electric railway system, the combination of a receiving station and a plurality of local stations, a suspended main line track connecting the plurality of local stations with the receiving station, a suspended local branch track having its terminals arranged adjacent to the main line track, switches at the junctions of the terminal of the local track with the main line track for momentarily directing electrically propelled vehicles from the main line track to one end of the local track and permitting the vehicle to pass from the other end of the local track on to the main line track, a plurality of electrically propelled vehicles adapted to run upon the main line track, electrically operated motor means at each local station for controlling the switch thereat which directs the incoming vehicles from the main line track on to the local track, and electric circuit controlling means upon the respective electrically propelled vehicles for energizing the electrically operated motor means whereby said vehicles belonging to the respective local stations will automatically control the operation of the switches of the corresponding local station so that the vehicles belonging to the respective stations will automatically leave the main track and respectively pass upon the local tracks when they reach the proper local station.

2. The invention according to claim 1, further characterized by having devices which cause circuit controlling means to operate to cause the switch operated motor means to close the switch for the main line track when the operating electric vehicle has passed from the main line over the switch and upon the local track, whereby the main line track is normally continuous for the passage of vehicles from the receiving station to the more or less distant local stations.

3. The invention according to claim 1, further having the switches between the main line track and the outgoing end of the local tracks spring actuated so that they normally provide a continuous main line track but will automatically open to permit the passage of the vehicle from the local track upon the main line track.

4. The invention according to claim 1, wherein the suspended main line track constitutes an electric conductor leading from a source of electric energy and wherein there is further provided a suspended electric conductor substantially parallel to the suspended track, said track rigidly supported by posts at intervals, floating means connecting the track and suspended conductor at intervals between the post whereby their substantial parallelism is insured and electric circuits on the vehicles and including the motor thereof having one end electrically in connection with the supporting wheels and having the other end terminating in a contact device in communication with the suspended electrical conductor.

5. The invention according to claim 4, further provided with movable connecting means arranged at intervals and connected between the lower part of the suspended main track and the upper part of the suspended electric conductor and located to one side of a vertical plane through said track and conductor, whereby they are constantly maintained in parallel relation, and wherein further the vehicles are provided with grooved wheels running upon the suspended track and are also provided with depending frames extending downward below the track and upon the opposite side thereof to where the connections are provided between said track and the electric conductor.

6. The invention according to claim 5, further provided with a suspended supporting cable also constituting a supply conductor leading from the source of electric energy, said supporting conductor looped at intervals to form catenary portions, and vertical connections at intervals along said catenary portions of the supporting conductor and the suspended track and electric conductor, whereby said parts are maintained in a substantially horizontal position.

7. The invention according to claim 6, wherein the suspended track is electrically insulated from the supporting cable, and the electric conductor is also insulated from the supporting conductor except at widely spaced intervals.

8. The invention according to claim 1, wherein the local stations and their electrically propelled vehicles are provided with automotic switch devices for causing the vehicles to be put out of circuit when they have passed upon the local track.

9. The invention according to claim 1, wherein the local track has a portion of its length electrically insulated from the source of electric energy whereby the electrically propelled vehicles become inoperative as motor vehicles when they reach said sections of the local tracks and may at those places be moved by hand.

10. The invention according to claim 1, wherein the receiving station is provided with a plurality of suspended branch tracks electrically insulated from the source of energy, and a plurality of switches for bringing the respective branch tracks into communication with the main line track.

11. In an electric railway system, the combination of a suspended track combined with an electrically propelled vehicle having a single grooved wheel running upon the said track, an inverted J-shaped frame having bearings in which the grooved wheel is journaled, said frame extending downward and transversely under the suspended track and terminating in a depending hook, an electric motor secured directly to the lower transverse portion of the vehicle frame so as to counter-balance it and hold the wheel in vertical position, power devices between the motor shaft and the shaft of the grooved wheel, the depending hook portion electrically independent of the motor, and a merchandise vessel having means for suspension from the hook.

12. The invention of claim 11, further characterized by the motor having its shaft arranged obliquely and transversely of the plane of the wheel and bevel gearing between the oblique motor shaft and the grooved wheel.

13. In an electric railway merchandise transporting system, a suspended track forming an electric conductor, combined with a motor vehicle comprising a frame of inverted J shape, the U portion inverted above the track and the remaining portion extending downward and obliquely under the track and terminating in an insulated depending portion for sustaining the merchandise, a grooved supporting wheel journaled in the U shaped portion of the frame and running upon the track, an electric motor secured to the oblique portion of the frame below the track and having an oblique shaft extending upward above the track, gearing between the oblique motor shaft and the grooved supporting wheel to rotate it, a can having a bail detachably connecting with the depending portion of the frame, and electric circuit means between the motor and the suspended track and partly carried by the frame.

In testimony of which invention, I hereunto set my hand.

ELBERT E. HAWKINS.